Figure 1:
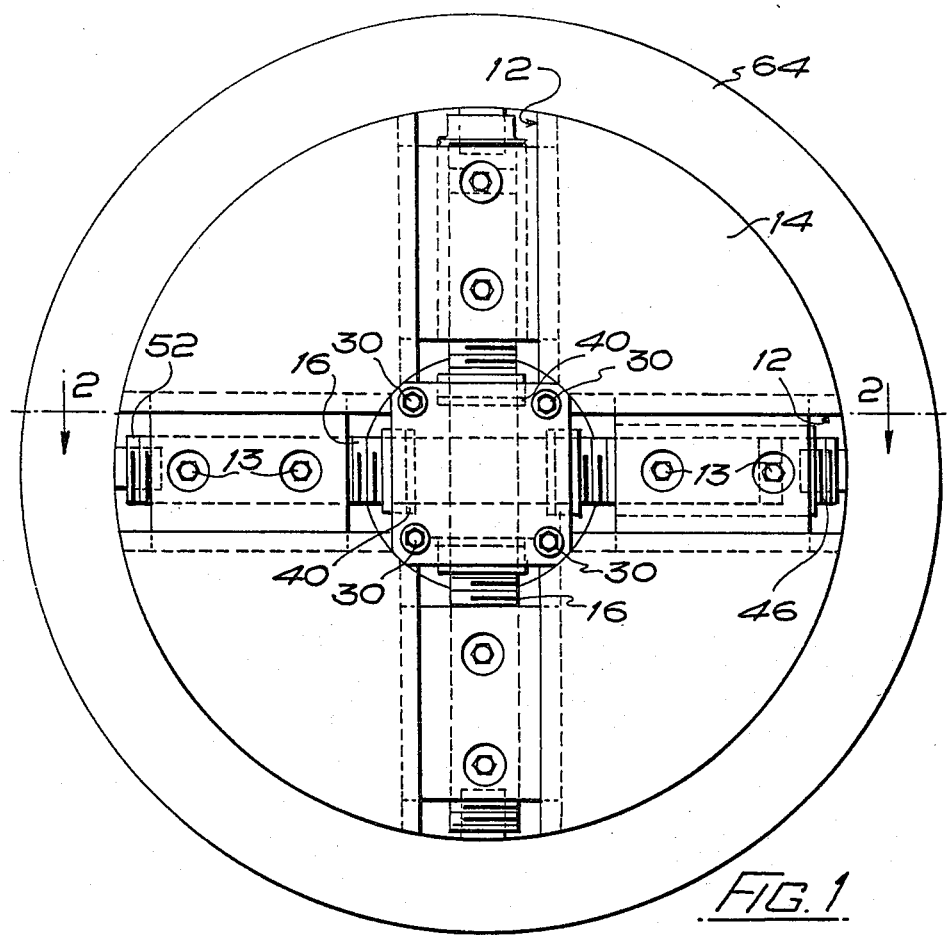

United States Patent [19]

Smith

[11] 4,429,887
[45] Feb. 7, 1984

[54] 4-JAW WORK HOLDING LATHE CHUCK

[76] Inventor: Bernard Smith, 33 Bagshawe Avenue, Chapel-en-le-Frith, Stockport, Cheshire SK12 6SE, England

[21] Appl. No.: 317,860

[22] Filed: Nov. 3, 1981

[30] Foreign Application Priority Data

Nov. 29, 1980 [GB] United Kingdom ............... 8038413
Apr. 8, 1981 [GB] United Kingdom ............... 8111074

[51] Int. Cl.$^3$ .......................................... B23B 31/16
[52] U.S. Cl. .................................. 279/112; 279/110; 269/74
[58] Field of Search ............... 279/111, 112, 113, 114, 279/115, 116; 409/167; 269/74, 242, 243

[56] References Cited

U.S. PATENT DOCUMENTS

| | | | |
|---|---|---|---|
| 187,438 | 2/1877 | Westcott | 279/113 |
| 331,603 | 12/1885 | Barnes | 279/113 |
| 498,998 | 6/1893 | Weatherby | 279/113 |
| 767,678 | 8/1904 | Barnaby | 279/113 |
| 1,048,944 | 12/1912 | Cook | 279/113 |
| 2,215,621 | 9/1940 | Slavik | 279/1 K |
| 3,656,773 | 4/1972 | Blattry et al. | 279/112 |
| 3,802,713 | 4/1974 | Levy | 279/113 |
| 4,192,521 | 3/1980 | Smith | 279/112 |
| 4,213,622 | 7/1980 | Rohm | 279/1 K |

Primary Examiner—Z. R. Bilinsky
Assistant Examiner—Thomas M. Kline
Attorney, Agent, or Firm—Burns, Doane, Swecker & Mathis

[57] ABSTRACT

Locking mechanism for the adjusting mechanism of a 4-jaw work holding rotary chuck of the kind having oppositely disposed pairs of jaws normally adjusted in position with equal and opposite movement but having provision for differential adjustment of one of each pair of oppositely disposed jaws relative to the other, the locking mechanism being constituted by a spring loaded driving member drivably connected to the adjusting mechanism and by a fixed element which the spring loaded driving member is capable of engaging non-rotatably, a turning moment applied to said spring loaded driving member in either direction being effective first to displace the latter from engagement with said fixed element and then to rotate the adjusting mechanism.

8 Claims, 5 Drawing Figures

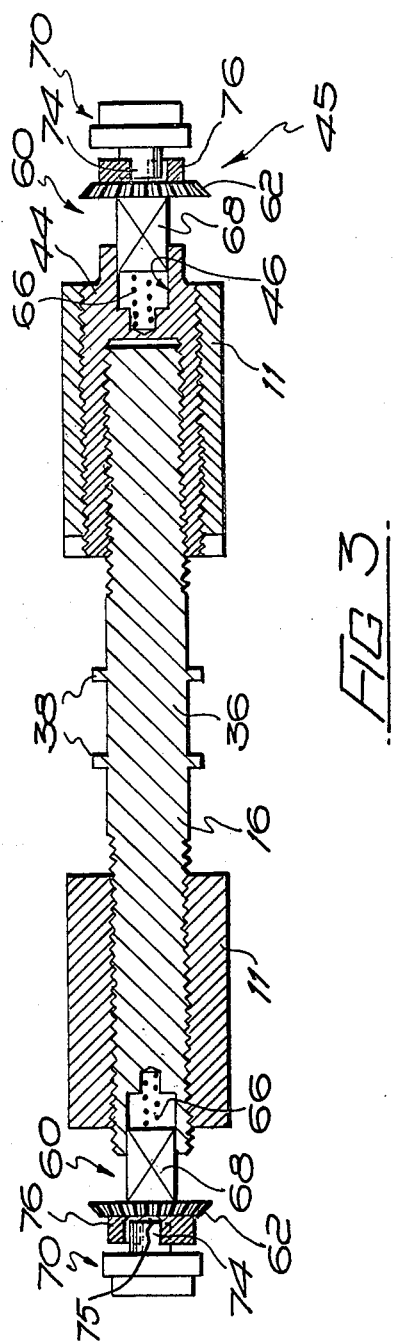

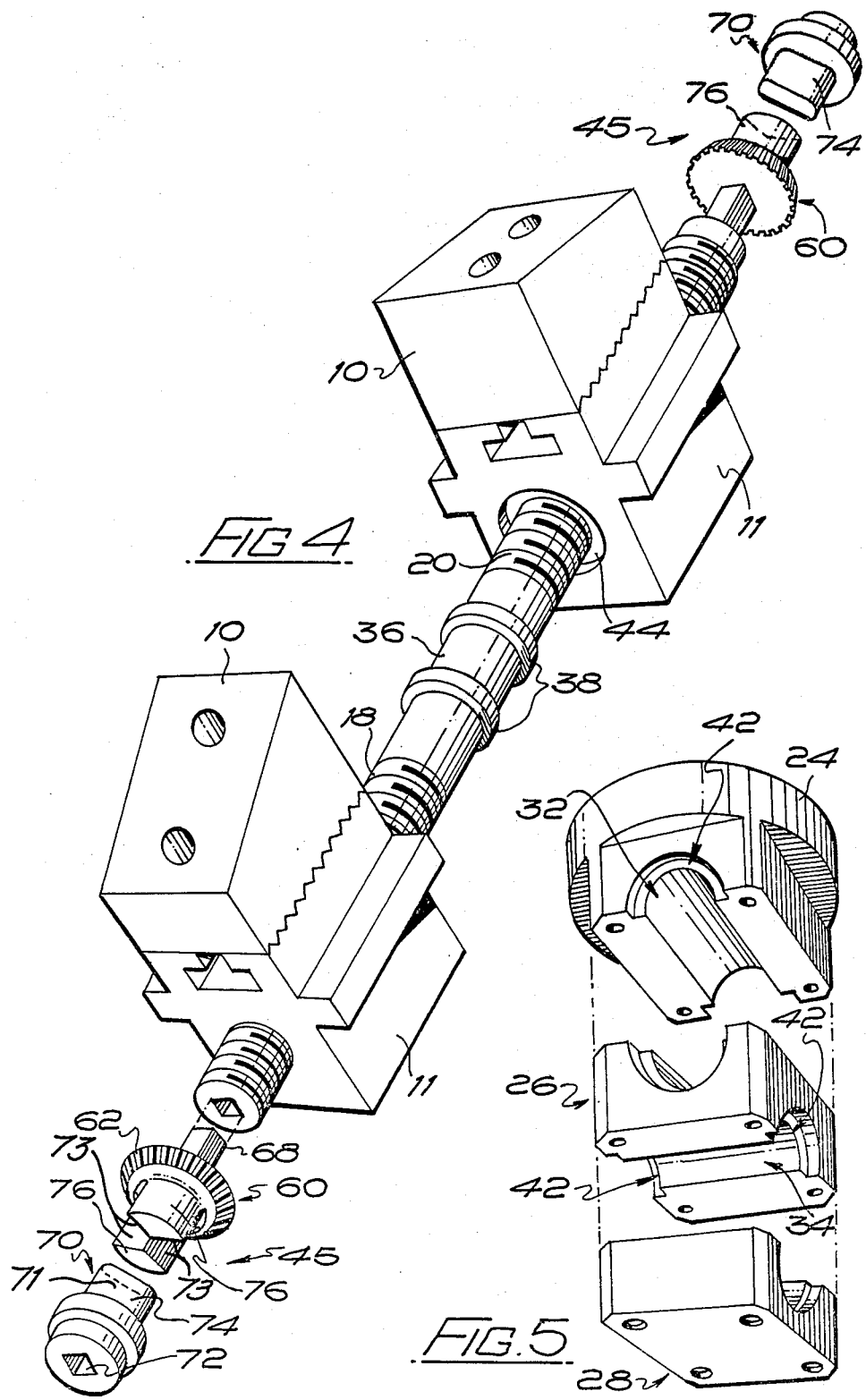

4-JAW WORK HOLDING LATHE CHUCK

The invention relates to a 4-jaw work holding lathe chuck.

A 4-jaw work holding rotary chuck is known having a body part with oppositely disposed radiating guides, respective jaws slidably adjustable along said guides; a pair of adjusting screws extending diametrically across the body part, each adjusting screw having a right hand thread at one end and a left hand thread at the other end whereby, as the screw is turned, the oppositely disposed pair of jaws concerned are adjusted in position with equal and opposite movement, the adjusting screws being disposed in mutually offset planes and crossing each other at the axis of the chuck so that each adjusting screw can be operated independently of the other for adjusting the jaws in oppositely disposed pairs. Such a chuck is hereinafter termed a chuck of the kind referred to.

It has previously been proposed to provide a chuck of the kind referred to with means for effecting a differential adjustment of one of each pair of oppositely disposed jaws relative to the other, such means being operable, independently of the adjusting screws, for effecting fine adjustment of a workpiece after it has been mounted in the chuck and for effecting initial displacements of one jaw relative to an oppositely disposed jaw to suit the irregular shape of a workpiece which is to be mounted in the chuck. The means for effecting such differential adjustment have been constituted by respective sleeves, associated with the adjusting screws, each sleeve being located on one end of its adjusting screw and being internally screwthreaded for engaging the screwthread at the end of the screw and externally screwthreaded, with a screwthread of opposite hand, for engaging the jaw which is adjustable by that end of the screw. Each sleeve has been provided at an outer end with a socket portion capable of being engaged by a key so that said sleeve can be turned relative to the adjusting screw on which it is located.

Such means for effecting differential adjustment of one of each pair of oppositely disposed jaws relative to the other have generally worked quite well but are prone to one particular drawback, this being that the sleeves need to be capable of being held against rotation whereby the jaws are normally adjustable in oppositely disposed pairs. It is also desirable that the screws should be capable of being held against rotation when differential adjustments are made by rotating the sleeves concerned. Friction means have been tried for holding at least the sleeves against rotation but constantly applied friction means have been found to be unreliable, mainly because frictional resistance can vary. A further disadvantage is that friction means applied both to the sleeves and adjusting screws tend to work against each other so that their effectiveness is cancelled out.

The invention as claimed is intended to provide a remedy. It solves the problem of how to design a 4-jaw work holding rotary chuck the jaws of which can be adjusted in oppositely disposed pairs, in which a differential adjustment of one of each pair of oppositely disposed jaws relative to the other can be effected with great facility.

The advantages offered by the invention are mainly that required adjustments of either an adjusting screw or its associated sleeve can be made without unwanted rotation of the other. Consequently, differential adjustments are facilitated. In addition, the chuck ensures repeatedly correct positioning of similar components irrespective of variations in size.

Figure 2:
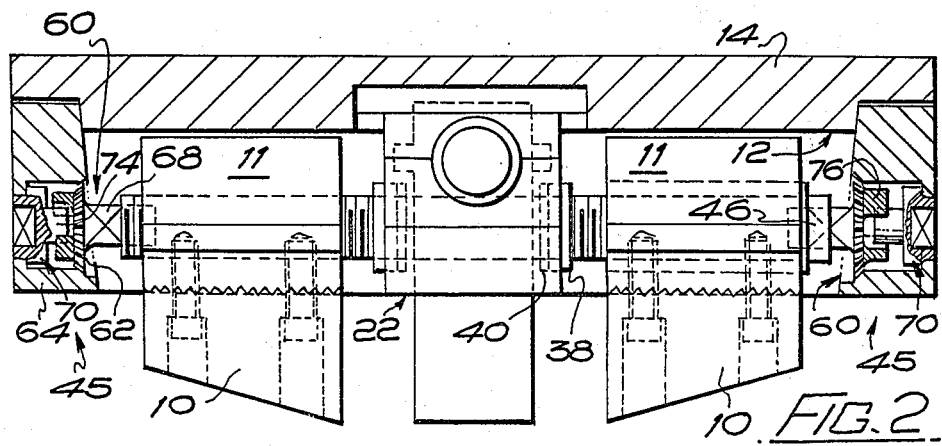

In order that the invention may be fully understood and readily carried into effect, the same will now be described, by way of example only, with reference to the accompanying drawings, of which:

FIG. 1 is a view on the face of a 4-jaw work holding rotary chuck embodying the invention, FIG. 2 is an axial section on the line 2—2 in FIG. 1, FIG. 3 is a scrap longitudinal section through one of two adjusting screws and associated screwthreaded parts which will presently be referred to, FIG. 4 is a perspective view of the adjusting screw and associated parts shown in section in FIG. 3, and FIG. 5 is an exploded view of a part of the chuck which will presently be referred to.

Referring now to the drawings, the work holding chuck there illustrated has four jaws 10 carried by respective jaw blocks 11 which are slidably disposed in guides 12 extending radially in a body 14 and which are adjustable in oppositely disposed pairs by adjusting screws 16.

The adjusting screws 16 extend diametrically across the chuck body and each screw has a right hand thread 18 at one end and a left hand thread 20 at its other end (the lead of each thread being the same) so that when the screw is rotated by means which will presently be described, the pair of jaws which it controls are moved towards or away from each other with equal and opposite movement. As shown, the adjusting screws are axially located, to extend in mutually perpendicular planes diametrically across the chuck body, by mounting means generally indicated 22 at the axis of the chuck body. The mounting means 22 are constituted by a stack of three elements 24, 26 and 28 which are clamped together by four bolts 30. As best seen in FIG. 5 the two joint faces between the three elements bisect respective bores 32 and 34 which cross at minimum spacing in mutually perpendicular planes for receiving respective center sections 36 of the adjusting screws. Pairs of thrust collars 38 are formed integrally on the adjusting screws as shown, and flank the mounting means 22 at the axis of the chuck body. Thrust washers, 40, formed in halves so that they have been able to be located on the center sections of the adjusting screws, are provided between the thrust collars 38 and counterbored abutment surfaces 42 of the mounting means.

Means are provided for effecting a differential adjustment of one of each pair of oppositely disposed jaws relative to the other. These means are constituted by a pair of sleeves 44 which are respectively associated with the adjusting screws, each sleeve being located on one end of its adjusting screw and being internally screwthreaded for engaging the screwthread at that end of the screw and externally screwthreaded with a screwthread of opposite hand for engaging the jaw block which is adjustable by that end of the screw. A square socket portion 46 which is formed at an outer end of each sleeve is drivably connected to lockable driving means generally indicated 45 whereby said sleeve can be turned, relative to the adjusting screw on which it is located, by means of an extraneous key (not shown). When the sleeve is turned in this way, the jaw with which it has screwthreaded engagement is adjusted in position, towards or away from the oppositely disposed jaw and independently of the latter. The key can also be engaged with similar driving means at the other end of the adjusting screw so that the latter can be rotated to bring the pair of jaws which it controls towards or away from each other with equal and opposite movement.

However, when required, a differential adjustment of one of either pair of oppositely disposed jaws can be effected relative to the other by turning the appropriate sleeve referred to whilst the associated adjusting screw is held against rotation. Such a differential adjustment may be made to effect a fine adjustment of a workpiece after it has been mounted in the chuck or to effect an initial displacement of one jaw relative to an oppositely disposed jaw to suit the irregular shape of a workpiece which is to be mounted in the chuck (and it will be understood that if the workpiece is the first of a batch of similar workpieces, the mounting of subsequent workpieces in the chuck will be effected by turning only the adjusting screws 16 to effect the opening and closing of the jaws in oppositely disposed pairs).

The lockable driving means 45 which are drivably connected to the socket portions of the sleeves 44 and to the ends of the adjusting screws remote from said sleeves include respective spring loaded driving members 60 each of which has a toothed element 62 capable of non-rotatably engaging a similarly toothed peripheral part of the chuck body, that is to say a steel support ring 64 with a slightly tapered bore which has been pulled tight on the body part by means of high tensile bolts (not shown). Respective springs 66 act against the driving members to urge the toothed elements 62 into engagement with said peripheral part of the chuck body, said springs being housed in cavities formed in the sleeves 44 or in the ends of the adjusting screws remote from said sleeves, as the case may be. Each driving member is provided with a spigot portion 68 of square cross section which is a sliding fit in the socket portion of the sleeve or adjusting screw, as the case may be, so that despite being capable of axial movement, each driving member remains drivably connected to its associated sleeve or adjusting screw. The driving means also include respective torque applying members in the form of driving dog members 70 which are rotatably mounted in the peripheral part of the chuck, that is to say in cavities provided in the steel support ring 64. Socket portions 72 of said driving dog members extend radially outwards through holes in the support ring and are accessible for the fitment of the chuck key referred to earlier. Driving dog portions 74 of said driving dog members extend radially inwards between respective pairs of driven dogs 76 which are formed integrally with the spring loaded driving members 60. The manner in which driving surfaces 71 on the driving dog portions 74 co-operate with driven surfaces 73 on the pairs of driven dogs constitutes lost motion rotation of the driving dogs 74 relative to the driven dogs 76, and cam means 75 acting between the driving dog members and said spring loaded driving members 60, the arrangement being such that when the chuck key is used to turn one of the driving dog members, this is effective first, during the lost motion rotation between the dogs 74, 76, to move the associated driving member axially to displace the latter from engagement with the support ring and then to rotate the appropriate sleeve or adjusting screw, as the case may be. When the chuck key is then removed, the spring loaded driving member is able to return to its normal position in which its toothed element non-rotatably engages the similarly toothed part of the support ring.

Thus it will be understood that required adjustments of either an adjusting screw or its associated sleeve 44 can be made without unwanted rotation of the other. A 4-jaw work holding chuck embodying the invention can be used by an operator of limited skill to mount and machine a batch of similar workpieces of irregular shape in a minimum of time. The chuck also ensures repeatedly correct positioning of similar components irrespective of variations in size since dimensional variations from one component to another are automatically shared out each side of the center line of the chuck.

Various modifications may be made without departing from the scope of the invention. For example, it would be feasible (but probably not desirable) to provide the lockable driving means referred to for positively holding only the sleeves 44. Furthermore, in the accompanying drawings the jaws 10 are shown to have serrated surfaces engaging serrated surfaces of the jaw blocks 11 and the jaws are shown to be secured to said jaw blocks by means of Allen screws 13 (and in this way it will be seen that a coarse differential adjustment of the jaws could be effected by adjusting the position of one or more of the jaws on their jaw carriers. However, if preferred, the jaws could be connected to the jaw blocks by tenon-like interengagement. The means whereby the adjusting screws are mounted in the chuck body, may also be constructed differently than described and illustrated. The springs 66 which act to urge the driving member 60 outwardly of the sleeves 44 need not be housed wholly in said sleeves. Preferably, said springs will extend through holes in the sleeves and be partly housed in cavities in the adjacent ends of the adjusting screws. The bevel like toothed elements forming part of the lockable driving mechanisms compensate for wear by seating themselves further into the depressions in the body part (that is in the support ring 64 forming a part of the body) in which they can non-rotatably engage. However, they could be of straight form if preferred. The cam means provided between the driving dog members 70 and their associated driving members 60 need not be constituted by the ends of the driving dog portions 74 engaging the curved bottoms of the cavities between the pairs of driven dogs 76. Cam surfaces could instead be formed in the faces of the driving dog members 70 adjacent the end surfaces of the driven dogs 76. Indeed, both these configurations could be incorporated to form a double cam arrangement associated with each torque applying means.

What I claim and desire to secure by Letters Patent is:

1. A 4-jaw work holding rotary chuck comprising a body part with oppositely disposed radiating guides; respective jaws slidably adjustable along said guides; a pair of adjusting screws extending diametrically across the body part and each extending through a pair of opposed jaws, each adjusting screw having a right-hand thread at one end and a left-hand thread at the other end for adjusting the respective pair of jaws with equal and opposite movement, the adjusting screws being disposed in mutually offset planes and crossing each other at the axis of the chuck so that each adjusting screw can be operated independently of the other for adjusting the associated pair of jaws relative to the other pair; means for effecting a relative adjustment of one of each pair of jaws relative to the other jaw of such pair, said means being operable independently of said adjusting screws and comprising a pair of sleeves associated with respective ones of the adjusting screws, each sleeve being mounted on one end of its associated adjusting screw and being internally screwthreaded for engaging the screwthread at that end of the screw and externally screwthreaded, with a screwthread of opposite hand, for engaging the jaw which is mounted on that end of the screw; a pair of lockable driving means for rotatably driving respective ones of said sleeves, each driving means comprising a rotary driving member arranged for non-rotatably engaging said body part of the chuck and being movable relative to its associated sleeve out of non-rotary engagement with said body part; spring means for yieldably urging said driving member into non-rotary engagement with said body part; and a pair of rotatable torque applying means being provided for rotating said driving members, each torque applying means comprising a driving surface arranged in lost motion rotary driving connection with a driven surface of the associated spring loaded driving member, and cam means on said associated torque applying means for engaging and displacing said driving member along the axis of the associated sleeve and out of non-rotary engagement with said body part during lost motion rotation of said driving surface relative to said driven surface so that said driving member becomes rotatable by said driving surface.

2. A 4-jaw work holding rotary chuck as claimed in claim 1, in which the spring loaded driving members are provided with respective toothed elements by means of which they are capable of non-rotatably engaging the body part of the chuck.

3. A 4-jaw work holding rotary chuck as claimed in claim 1, in which the adjusting screws are located in the chuck body by mounting means at the axis of said body, said mounting means being constituted by a stack of three elements clamped together at the axis of the body, the two joint faces between the three elements bisecting respective bores arranged in mutually perpendicular planes for receiving respective center sections of the adjusting screws.

4. A 4-jaw work holding rotary chuck as claimed in claim 3, in which pairs of thrust collars are formed integrally on the adjusting screws to flank the mounting means at the axis of the chuck body.

5. A 4-jaw work holding rotary chuck as claimed in claim 4, in which thrust washers formed in halves so that they can be located on the center sections of the adjusting screws are provided between the thrust collars and abutment surfaces of the mounting means.

6. A 4-jaw work holding rotary chuck according to claim 1, wherein said torque applying means includes a driving dog, said cam means and said driving surface being disposed on said driving dog.

7. A 4-jaw work holding rotary chuck according to claim 1 including an additional pair of lockable driving means for rotatably driving the ends of said screws which do not carry said sleeves, each additional driving means comprising an additional rotary driving member arranged for non-rotatably engaging said body part of the chuck and being movable relative to its associated screw out of non-rotary engagement with said body part; additional spring means for yieldably urging said driving member into non-rotary engagement with said body part; and a pair of additional torque applying means each comprising an additional driving surface arranged in lost motion rotary driving connection with an additional driven surface of the associated spring loaded additional driving member, and additional cam means on said associated additional torque applying means for engaging and displacing said additional driving member along the axis of the associated screw and out of non-rotary engagement with said body part during lost motion rotation of said additional driving surface relative to said additional driven surface so that said additional driving member becomes rotatable by said additional driving surface.

8. A 4-jaw work holding rotary chuck according to claim 7, in which said additional spring loaded driving members are provided with respective additional toothed elements by means of which they are capable of non-rotatably engaging the body part of the chuck.

* * * * *